ically active and as resulting from improper dispersion of the catalytic material on the support or distender and improper penetration of the catalytic material into the pores of the support.

United States Patent Office 3,106,569
Patented Oct. 8, 1963

3,106,569
CATALYTIC PRODUCTION OF MALEIC AND PHTHALIC ANHYDRIDE
Warn D. Robinson, Webster Groves, Mo., assignor to Monsanto Chemical Company, St. Louis, Mo., a corporation of Delaware
No Drawing. Original application Dec. 31, 1957, Ser. No. 706,287. Divided and this application Dec. 3, 1959, Ser. No. 856,919
9 Claims. (Cl. 260—346.4)

This invention relates to the catalytic oxidation of organic compounds and more particularly to the vapor phase catalytic oxidation of organic compounds in the preparation of organic dicarboxylic acids and anhydrides, such as maleic acid, maleic anhydride, phthalic acid and phthalic anhydride.

This application is a division of copending application Serial Number 706,287, filed December 31, 1957, now abandoned, which is a continuation-in-part of application Serial Number 626,591, filed December 9, 1956, now abandoned, which is a continuation-in-part of application Serial Number 406,580, filed January 27, 1954, now abandoned.

The principal objects of this invention are to provide an improved vanadium containing catalyst for the vapor phase oxidation of organic chemical compounds. A more specific object of this invention is to provide an improved vanadium containing catalyst for the vapor phase oxidation of organic chemical compounds to maleic acid and/or maleic anhydride, such as the oxidation of, for example, the butanes, the butenes, the pentanes, the pentenes, the hexanes, the heptanes, the heptenes, the octanes and the octenes, cyclopentane, cyclopentene, cyclohexane, cyclohexene, benezene, toluene, phenol, crotonaldehyde crotonic acid, furan, furfuryl alcohol, furfural, oxymethyl furfural and turpentine oil to maleic acid and/or maleic anhydride; and for the vapor phase oxidation of such organic compounds to phthalic acid and/or anhydride as, for example, the oxidation of naphthalene, the xylenes, phenanthrene, indene, and bicyclononadienes, among others. The vapor phase oxidation of the above organic compounds to dicarboxylic acids and/or anhydrides is well known by those skilled in the art.

The vapor phase catalytic oxidation of the above organic compounds is accomplished by a process in which a gaseous reaction mixture of the organic compound and an oxygen containing gas is passed in contact with a catalyst contact mass containing metallic oxides. This vapor phase oxidation process is well known to those skilled in the art and many metallic oxides have been suggested as catalysts for use in such processes either alone or in various combinations. The oxidation of materials oxidizable to maleic acid or anhydride and phthalic acid or anhydride has presented problems not encountered in the catalytic formation of other organic materials. A number of catalytic materials proposed for the oxidation of other organic materials such as the oxidation of alcohols to acids are active to some degree to promote the oxidation of, for example, benzene to maleic anhydride or naphthalene to phthalic anhydride. However, the yields obtained of maleic anhydride or phthalic anhydride are too low and either an excessive proportion of the oxidizable material passes uncharged or is completely oxidized to carbon dioxide and water. Also in the case of the vapor phase oxidation of benzene, some proposed catalyst combinations result in the formation of excessive quantities of lower aliphatic acids.

Chief among the catalysts successfully employed in the oxidation of materials oxidizable to maleic acid and anhydride and phthalic acid and anhydride are molybdenum and vanadium which are usually employed in the form of their oxides. Often other materials are added to increase the effectiveness of molybdenum or vanadium. Catalyst materials containing vanadium or molybdenum together with other promoters, stabilizers or the like, are many times referred to as vanadium or molybdenum catalysts depending, of course, on the major component of the material. For example, a two-component mixture containing more than 50% vanadium is referred to as a vanadium catalyst. Likewise, a three-component catalyst containing 40% or more vanadium and 30% or less of each of the other components is referred to as vanadium catalyst. This invention pertains to vanadium containing catalysts including such catalysts in which vanadium is the only metal component as well as those in which vanadium is a major as well as a minor component and a method of preparing these catalysts especially for use in processes for preparing maleic anhydride and/or acid and phthalic anhydride and/or acid by the controlled vapor phase oxidation of materials oxidizable to maleic acid and/or anhydride and materials oxidizable to phthalic anhydride and/or acid with an oxygen containing gas.

Generally the catalytic mixture is supported on some inert base or support which acts as a distender. These bases are generally much lower in cost than are the metallic components of the catalyst and hence help reduce the cost of the resulting catalytic contact mass. Also, since the efficiency of the catalyst seems to be to some extent a function of the surface area, the inert base or support gives the catalytic contact mass a greater surface area than that otherwise would be possessed by the catalyst. Impregnating a porous inert support with a catalytic material in such a manner as to provide a porous catalytic contact mass also enhances the efficiency of the catalytic mixture by exposing a maximum of active surface area to the gaseous reaction mixture.

A common method of preparing a vanadium oxide containing catalytic contact mass is to coat and/or impregnate particles of the inert carrier support with a solution containing a vanadium catalytic composition which can be readily converted to the oxide or oxides of vanadium. The carrier thus treated is heated to remove the solvent and thereby produce a coating of the vanadium containing catalyst on and in the carrier. The vanadium containing composition is then converted chemically to the oxide or oxides of vanadium. When a promoter or stabilizer is to be employed with vanadium they are added to the solution containing the vanadium compound and the entire mixture employed to coat or impregnate the carrier. When such promoter or stabilizer materials are employed the resulting catalyst on the carrier is generally a mixture of oxides. Various catalytic contact masses heretofore disclosed as being useful to promote vapor phase oxidation of materials oxidizable to maleic acid and/or anhydride and phthalic acid and/or anhydride result in yields which are not satisfactory, usually ranging from about 33% to about 40% of the amount of the acid or anhydride theoretically obtainable from the organic material being oxidized. For example, when the catalytic contact masses heretofore disclosed are employed in the oxidation of benzene the yield of maleic acid per 100 pounds of benzene charged is about 50 to about 60 pounds after a period of stabilized oxidation condition is obtained. Some catalytic contact masses heretofore proposed produce a higher initial yield but very readily degenerate in a matter of a relatively short time to the yields described above. It is readily apparent that the various catalytic contact masses heretofore proposed are highly inefficient.

The inefficiency of processes for controlled catalytic oxidation of organic compounds, especially the controlled catalytic oxidation of organic chemical compounds to maleic anhydride and/or phthalic anhydride, is believed to be due to a drop off of activity of the catalytic materials. This dropping off of activity has been attributed to either removal of one of the catalyst components by sublimation or vaporization or a loss of catalytic area. There have been attempts to overcome the physical removal of part of the catalytic mixture by lowering the oxidation reaction temperature. Although such a modification does reduce the loss of certain components of the catalyst, the activity of the catalytic contact mass is also decreased thereby. It also appears that in general the catalytic contact masses heretofore proposed have a relatively short catalyst life, less than 1,000 hours. Thus, it is not economically feasible to employ any of these catalysts for more than about 1,000 hours of continuous operation.

According to the present invention, it has been found that a catalyst containing oxides of vanadium, molybdenum and titanium in the proportion represented by the atomic percentages of each of said metals of from about 50 to about 90 atomic percent of vanadium, from about 5 to about 45 atomic percent of molybdenum and from about 2 to about 30 atomic percent of titanium based on the sum of the atomic weights of said metals present, has an exceedingly long catalyst life and produces high consistent yields for thousands of hours. The preferred catalysts of this invention are those having from 60 to 86 atomic percent vanadium, 5 to 30 atomic percent molybdenum, and 8 to 10 atomic percent titanium. By "atomic percent," as employed in the specification and claims, is meant the fractional part (expressed as percent of the atomic sum) of the metals present.

It also has been discovered that the use of the above described catalyst in the controlled vapor phase oxidation of organic chemical compounds with an oxygen containing gas such as air, air enriched with oxygen and the like, at elevated temperatures, e.g. of from 300 to 600° C. and preferably from 350 to 450° C., and at a pressure of from atmospheric pressure to elevated pressures such as 50 pounds per square inch or higher results in the production of consistently high yields of dicarboxylic acids and anhydrides thereof such as maleic acid, maleic anhydride, phthalic acid and citraconic acid for many thousands of hours of continuous operation. Also by employing slightly modified conditions of temperature, pressure and oxygen content, alcohols may be oxidized to aldehydes and aliphatic monocarboxylic acids. More specifically, by employing the catalyst of this invention according to the process of this invention, exceedingly high yields of maleic acid in the range of from 90 to 100 or more pounds per 100 pounds of benzene charged can be achieved, or yields of phthalic anhydride above 80 pounds per 100 pounds of naphthalene charged can be achieved, or yields of maleic anhydride in excess of 80 pounds per 100 pounds of butadiene-1,3 charged can be achieved, or yields of maleic anhydride in excess of about 50 pounds per 100 pounds of furfural or crotonaldehyde can be achieved.

The catalyst mass of this invention containing the components described above does not possess the objectionable properties possessed by the metallic oxide catalysts heretofore employed, rather the catalyst of this invention is exceedingly stable, is far more active and its activity is constant over long periods of continuous use. The catalyst contact masses produced from the catalyst of this invention possess physical and catalytic stability greater than that which was possible to achieve with the catalysts heretofore proposed for the oxidation of materials oxidizable to maleic anhydride, maleic acid, phthalic anhydride, phthalic acid and other organic acid anhydrides and organic acids.

The process of this invention employing the new catalyst hereinbefore described reduces the free or unreacted material being oxidized present in the off-gases through the extremely high conversion to the desired product so that the gases after the removal of the desired product therefrom can be vented to the atmosphere without an appreciable loss of the starting material. For example, in the oxidation of benzene to maleic anhydride the gases remaining after the recovery of maleic anhydride can be vented to the atmosphere without an appreciable loss of benzene. In contrast to this, the off-gases from many of the processes heretofore proposed for the oxidation of organic chemical compounds to aldehydes, organic acids and organic acid anhydrides contained considerable quantities of the starting material and obviously could not be vented to the atmosphere without increasing processing costs due to the loss of appreciable quantities of the starting raw material.

It is desirable to support the catalytic material of this invention upon some mechanically strong and chemically inert body which has the combined effect of greatly extending the exposed surface of the catalyst and functioning as the support therefor to prevent mechanical disintegration of the catalyst into dust.

Among the substances which have been suggested as catalyst carriers are the following: ordinary unglazed porcelain, pumice, asbestos, and shaped pieces of metal which can be coated with a sufficient layer of catalyst so that the metal itself acts as a support and does not influence in any way the catalytic activity of the coating, except perhaps by extending the surface as a catalyst support normally functions. Also with respect to catalytic inactivity toward chemical reactions and resistance to fusion by heat, silica in a porous form is recognized as being of exceptional merit as a catalyst carrier. Any of these or other inert materials such as for example, quartz fragments, alumina, corundum, diatomaceous stones, among others, can be employed as a carrier for the catalyst of this invention.

An exceedingly useful carrier or support for the catalyst of this invention employed to prepare the catalytic contact mass used in the process of this invention is porous material prepared by mixing finely ground silica or material rich in silica with finely ground refractory glass of which the "Pyrex" type is suitable and then heating said mixture to a temperature sufficient to soften the glass. These carriers are mechanically very hard and strong, chemically inert when used in the catalytic oxidation of organic materials, especially when very thinly coated, and are of sufficient porosity to absorb or otherwise hold and retain a catalytic material in relatively permanent association.

A highly convenient method of preparing this particular carrier of the preferred inert carriers comprises adding to the pulverized silica and glass a temporary and volatile binder which holds the material as a coherent mass during the preliminary stages of forming but disappears during calcination.

Finely divided pumice of 100 to 300 mesh (U.S. Standard sieve size) is also an exceedingly useful catalyst support where the catalytic contact mass is to be employed as a fluid catalyst. Larger particles can be used where the catalyst contact mass is utilized as a fixed bed. Quartz fragments are also extremely useful as a catalyst carrier for the catalyst of this invention for fixed bed catalytic contact masses. Small shaped pieces of metal and metal turnings, to which a relatively thick uniform continuous coating of catalyst can be applied, are also suitable as catalyst carriers for the catalyst of this invention for fixed bed catalyst contact masses. The use of these and other carriers will be hereinafter illustrated.

The catalytic material of this invention may be applied to the above described carrier particles in any convenient manner. One method involves forming a solution of the soluble salts of vanadium and molybdenum and dispersing therein titanium oxide and then applying the resulting mixture to the particles by spraying or dipping to give a highly intimate and permanent association between the metallic compounds and the carrier. A second method which may be conveniently employed involves merely dusting the particles with the catalyst of this invention in a finely ground pulverulent state. A third method which can be employed involves preparing an aqueous paste comprising water soluble salts of vanadium and molybdenum which can be converted to vanadium and molybdenum oxides and titanium oxide so that the paste contains these three metals in the proportions hereinbefore defined, mixing said paste together with carrier particles in any suitable equipment to provide a uniform deposit of the paste on the particles. When either of these three methods is employed the catalyst may become intimately bonded to the carrier. Then the coated particles are subjected to heat treatment at a temperature sufficient to convert the salts of vanadium and molybdenum to their oxides. This may be accomplished in the presence of air, oxygen containing gas or even in the presence of an inert gas, especially where the salts of vanadium and molybdenum will readily break down to their oxides merely on heating and require no oxygen to convert them to the desired oxides. Other methods of preparing vanadium oxide catalysts, as for example by impregnation, precipitation, evaporation, extrusion, pelletizing a mixture, etc., which are known to those skilled in the art, can be used to prepare the catalyst compositions of this invention.

Suitable vanadium compounds convertible to oxides of vanadium upon heating under oxidation conditions include ammonium vanadate and such vanadium containing organic chemical compounds as amine salts of vanadic acid, amidine salts of vanadic acids, esters of vanadic acid and vanadium complex salts of organic and inorganic acids. Specific vanadium containing organic chemical compounds include but are not limited to vanadium lactate, cyclohexyl vanadate, benzyl vanadate, guanidine vanadate and diphenyl guanidine vanadate. Similarly the suitable molybdenum compounds convertible to oxides thereof upon heating under oxidation conditions include ammonium molybdate and such molybdenum containing organic compounds as amine salts of molybdic acid, amidine salts of molybdic acid, esters of molybdic acids and molybdenum complex salts of organic and inorganic acids.

The following examples are illustrative of the present invention but are not to be construed as limitations thereon.

EXAMPLE I

A paste is prepared from a mixture containing 38.2 parts by weight of ammonium vanadate, which have been previously reduced with $SO_2$, 12.8 parts by weight of unreduced ammonium vanadate and 3.9 parts by weight of titanium dioxide slurried with 250 ml. of water made definitely alkaline with concentrated aqueous ammonium hydroxide solution.

To this alkaline slurry there is added an aqueous solution containing 9.5 grams of ammonium paramolybdate $[(NH_4)_6MO_7O_{24}4H_2O]$ in 50 ml. of water and the resulting mixture stirred and heated to 80° C. The metals present in this composition are in the proportion of 81 atomic percent vanadium, 10 atomic percent molybdenum and 9 atomic percent titanium.

To this paste there is added 250 cc. of porous carrier particles of silica and refractory glass in the form of small cylinders having an axis of about 0.16 inch in length and 0.16 inch in diameter, hereinafter referred to as 0.16 inch pellets. The entire mass is stirred slowly while driving off the water on a steam bath. The coated pellets are then dried.

EXAMPLE II

To an aqueous mixture prepared by combining 38.2 grams of reduced ammonium vanadate, 12.8 grams of unreduced ammonium vanadate and 3.9 grams of titanium dioxide in 250 ml. of water made alkaline with ammonium hydroxide, there is added 9.5 grams of ammonium paramolybdate in 50 ml. of water. The resulting mixture is stirred and heated on a steam bath to about 80° C. Thereafter 250 cc. of 0.16 inch pellets heated to about 80° C. are added and the entire mass is stirred and heated on the stream bath until it appears dry. The coated pellets are air dried.

EXAMPLE III

An aqueous slurry made alkaline with ammonium hydroxide and containing 3.9 grams of titanium dioxide, 9.5 grams of ammonium paramolybdate, 51 grams of ammonium vanadate and about 22 grams of ammonium sulfate is stirred and heated on a steam bath to 80° C. The resulting hot mixture together with 250 cc. of 0.16 inch pellets are slowly mixed together until the pellets are uniformly coated and appear dry. The coated pellets are air dried.

The metals in the catalyst mixture prepared in Examples II and III are present in the proportion of 81 atomic percent vanadium, 10 atomic percent molybdenum and 9 atomic percent titanium.

The coated particles described in Examples I and III can be calcined at 300° to 600° C. in a muffle furnace to convert the salts of vanadium and molybdenum to their oxides and charged to a fixed bed such as converter tubes fitted with an inlet charging line for the feed mixture of benzene and oxygen containing gas and a discharge line for the gaseous oxidation products. Or the dried coated particles can be charged to such a fixed bed and heated to a temperature of from about 300° C. to about 600° C. while passing air, generally preheated air, through the bed of coated particles.

EXAMPLES IV TO XI

Fused silica-refractory glass 0.16 inch pellets coated as described in Examples I to III are charged to a multitube converter. All the converter tubes are surrounded by a heated, thermostatically controlled bath. A feed line is connected to the top of the converter tubes and a discharge line is connected to the bottom of the tubes and vented to the atmosphere. The bath is brought to about 400° C. and maintained at that temperature while air is passed through the catalyst mass to convert the metal salts to their oxides. Thereafter the temperature of the bath is adjusted to the desired temperature and a mixture of air and benzene vapor is charged to the converter tubes and the discharge line is now connected to a water absorption system to scrub maleic anhydride out of the discharge gases.

Tabulated in Table I below are the results of operation of the above described vapor phase oxidation of benzene to maleic anhydride carried out at different temperatures and ratios of air to benzene but at a substantially constant rate of flow of gaseous feed per volume of catalyst and at a substantially constant head pressure.

*Table I*

VAPOR PHASE CATALYTIC OXIDATION OF BENZENE WITH AIR IN THE PRESENCE OF MIXTURE OF OXIDES OF V, Mo AND Ti

[Atomic percent: 81% V, 10% Mo, 9% Ti]

| Example Number | Bath Temp., ° C. | C.f.m. Air per lb. Benzene | Weight Yield [2] |
| --- | --- | --- | --- |
| IV | 380 | 491 | 80.5 |
| V | 390 | 531 | 91 |
| VI | 400 | 509 | 92.6 |
| VII [1] | 400 | 500 | 94 |
| VIII | 410 | 478 | 91.5 |
| IX | 415 | 504 | 86 |
| X | 430 | 530 | 80 |
| XI | 430 | 529 | 80.4 |

[1] Catalyst of Example III. All other catalysts are of type described in Example I and II.
[2] Based on pounds of maleic acid recovered per 100 pounds of benzene charged.

In contrast to the above, the use of porous catalyst masses comprising the same type of fused silica-refractory glass particles coated with catalysts consisting of or consisting essentially of oxides of vanadium produces optimum yields at 460° C. which even for an initial operating period averages at least about 10% lower and furthermore the yield drops after prolonged operation to about an average of at least 30% lower at 460° C.

EXAMPLES XII to XVI

Porous catalyst masses whose coatings contain the atomic percentage of the metals as shown in Table II below, were prepared on particles of an inert carrier of a mixture of silica and refractory glass which fuses at a temperature above 600° C. These catalyst compositions were prepared according to the method described in Example I.

*Table II*

| Example Number | Atomic Percent Metals in Oxide Mixture | | |
|---|---|---|---|
| | Vanadium | Molybdenum | Titanium |
| XII | 73.6 | 18.2 | 8.2 |
| XIII | 85.4 | 5.0 | 9.6 |
| XIV | 77.3 | 14.0 | 8.7 |
| XV | 73.6 | 18.2 | 8.2 |
| XVI | 62.0 | 30.0 | 8.0 |

EXAMPLES XVII TO XXI

The catalyst masses of Examples XII to XVI when used in tube converter for the vapor phase oxidation of benzene as described in Examples IV to XI gave the results shown in Table III below wherein the operating conditions are also tabulated as in Table I.

*Table III*

VAPOR PHASE OXIDATION OF BENZENE WITH CATALYST OF VARIOUS RATIOS V, Mo and Ti OXIDES

| Example Number | Catalyst Ex. No. | Temp., °C. | C.f.m. Air per lb. Benzene | Weight Yield, Percent |
|---|---|---|---|---|
| XVII | XII | 420 | 496 | 90.1 |
| XVIII | XIII | 410 | 551 | 80.9 |
| XIX | XIV | 410 | 522 | 90.0 |
| XX | XV | 425 | 554 | 93.4 |
| XXI | XVI | 430 | 526 | 90.8 |

EXAMPLE XXII

The process of Examples IV to XI is repeated with the catalyst mass described in Example I except that the benzene air mixture is fed to the converter tubes under about 50 pounds' gage pressure instead of the 6 pounds' pressure. The weight yield of maleic acid from this process is greatly superior to that obtained with catalysts consisting of or consisting essentially of vanadium oxide employed under the same conditions.

The oxidation process described in the preceding examples employing the catalyst of this invention has been carried out continuously under the conditions set forth therein for many thousands of hours without experiencing a decrease in rate of production. For example, when catalyst masses comprising a carrier impregnated with a catalyst comprising or comprising essentially of oxides of vanadium are employed, the average weight yield of maleic acid over a period of several thousands of hours is only about 30 with initial operating yields in the range of 70 to 85.

The process of this invention has been described in terms of the use of multi-tube catalyst chambers. The tubes in such chambers can be from 0.5 inch to 3 inches or more in diameter and from 1 foot to 10 feet in length. However, the use of the catalyst mass and the practice of this invention is not limited to the use of multi-tube catalyst chambers. For the present invention can be practiced employing the novel catalyst disclosed herein in a converter employing a fluid catalyst as hereinbefore disclosed or in single or multiple pass tray converters. In such tray converters the air or oxygen containing gas is pre-heated to about operating temperature, passed through a benzene carburetor and then passed through a porous catalyst mass in a fixed bed 10 to 36 inches deep and 10 to 30 feet in diameter at a head pressure of from 0.1 to 3 pounds per square inch and at a flow rate of 4,000 to 6,000 c.f.m. or more. The operation of such a tray converter is more fully described in the following example.

EXAMPLE XXIII

Coated and impregnated inert particles having a coating prepared as described in Example III are charged to a tray converter to a depth of 24 inches on top of a punched plate at the bottom of a cylindrical catalyst chamber 10 feet in diameter and 36 inches high having a reducing section of frustum shape attached to the top and bottom thereof. Each of said reducing sections terminating at a diameter to accommodate a twelve inch duct. Air at a velocity of about 4,800 c.f.m. is blown through a pre-heating chamber where it is heated to about 430° C. and then passed through the catalyst bed from the top thereof to convert the metal salts to oxides of the metals. The spent gas discharging from the bottom of the converter is vented to the atmosphere. The catalyst mass is "burned in" in this manner for 12 to 30 hours. Thereafter a portion of the hot air is carbureted with benzene, mixed with the remainder of the air, and passed down through the catalyst bed. The temperature of the supply air is gradually reduced as the benzene feed is increased to maintain the catalyst bed temperature at about 300° C. to about 500° C. Although the oxidation process is highly exothermic, a sufficient amount of the heat of reaction is dissipated through radiation losses so that the reaction is readily controlled.

The gaseous mixture discharging from the catalyst bed is conducted to a heat exchanger, to preheat the feed air to be carbureted with benzene, and then is conducted to a water scrubber where the maleic anhydride in the gaseous mixture is recovered as an aqueous solution of maleic acid. The weight yield of maleic acid from a process such as described above will be in the range of 80 to 90% or higher based on the benzene charged.

The unoxidized benzene can be recovered from the gaseous mixture and recycled, if desired. However, a single pass tray converter as described above may be operated to produce only a very small amount of unoxidized benzene so that the gases discharging from the scrubber can be safely vented to the atmosphere.

Tray converters having a shallower catalyst bed and/or having a smaller diameter than that described above can be used in a multipass system where the discharge gases from the first converter after passing through a heat exchanger are passed down through a second catalyst bed. The number of catalyst chambers employed will, of course, depend upon the efficiency of each bed and the economics of achieving a high weight conversion of benzene.

EXAMPLE XXIV

An alkaline paste is prepared as described in Example I so that the metals present are in the proportion of 81 atomic percent vanadium, 10 atomic percent molybdenum and 9 atomic percent titanium. The resulting mass is placed in an oven, dried and then ground into fine particles.

These catalyst particles are charged to a fluid catalyst chamber and heated with a stream of hot air to convert the metal salts in the catalyst to their oxides and thereafter are used as a fluid catalyst for the oxidation of benzene in admixture with air (500 c.f.m. per pound of benzene) at temperatures in the range of 350° C. to 450° C. The conversions of benzene to maleic acid are substantially equivalent to those obtained in the examples illustrating this invention hereinbefore appearing. Similar results are obtained when the fluid catalyst is prepared by mixing the above-described alkaline paste with pumice (200 mesh) and then subjecting the resulting mass to the drying and grinding operations.

EXAMPLE XXV

An alkaline paste is prepared as described in Example I so that the metals present are in the proportion of 81 atomic percent vanadium, 10 atomic percent molybdenum and 9 atomic percent titanium. To this past there is added about 250 cc. of quartz fragments having a particle size of from 1/8 to 1/4 inch. The resulting mass is placed on a steam bath and stirred slowly until the fragments are coated and appear dry. Thereafter the coated fragments are air dried.

EXAMPLE XXVI

An alkaline paste is prepared as described in Example I so that the metals present are in the proportion of 81 atomic percent vanadium, 10 atomic percent molybdenum and 9 atomic percent titanium. To this paste there is added about 250 cc. of alumina particles having a particle size of from 1/16 to 3/8 inch. The resulting mass is placed on a steam bath and stirred slowly until the fragments are coated and appear dry. Thereafter the coated fragments are air dried.

EXAMPLE XXVII

An alkaline paste is prepared as described in Example I so that the metals present are in the proportion of 81 atomic percent vanadium, 10 atomic percent molybdenum and 9 atomic percent titanium. To this paste there is added about 250 cc. of diatomaceous stones having a particle size of from 3/8 to 1/2 inch. The resulting mass is placed on a steam bath and stirred slowly until the fragments are coated and appear dry. Thereafter the coated fragments are air dried.

EXAMPLE XXVIII

An alkaline paste is prepared as described in Example I so that the metals present are in the proportion of 81 atomic percent vanadium, 10 atomic percent molybdenum and 9 atomic percent titanium. To this paste there is added about 250 cc. of asbestos fibers. The resulting mass is placed on a steam bath and stirred slowly until the fragments are coated and appear dry. Thereafter the coated fragments are air dried.

The catalyst masses of Examples XXIV to XXVIII can be satisfactorily used in any suitable converter for the vapor phase oxidation of benzene as hereinbefore described.

The catalyst of this invention and the use thereof has been illustrated in the foregoing examples solely in the vapor phase oxidation of benzene to maleic anhydride. However, as heretofore stated the catalyst of this invention and the process of this invention can be used for the oxidation of other organic materials to maleic anhydride, phthalic anhydride, citraconic acid and other organic acid anhydrides, organic acids and even for the oxidation of alcohols to aldehydes and monocarboxylic acids.

To illustrate the use of the catalyst of this invention and the process of this invention for the oxidation of other organic materials the following examples are presented. In these examples the catalyst composition described in Example I was coated on the carrier particles, either of the silica-refractory glass type hereinbefore described or small shaped metal pieces so shaped as to form a porous bed for the catalyst contact mass. The exception to the use of this catalyst composition will be noted. The results of the oxidation of these various materials are tabulated and appear in Table IV. In these processes the material to be oxidized was admixed with air as hereinbefore described for benzene.

Table IV

| Example Number | Material Oxidized | Temperature, °C. | Weight Yield [3] Maleic Acid | Weight Yield [3] Phthalic Anhydride |
|---|---|---|---|---|
| XXIX | Naphthalene | 370 | [2] 10 | 85 |
| XXX | Ortho-Xylene | 400 | [2] 12 | 77 |
| XXXI | ----do---- | 460 | [2] 8 | 60 |
| XXXII | Ethylbenzene | 380 | 55.8 | |
| XXXIII | Butane | 440 | 20 | |
| XXXIV | Cyclohexane [1] | 460 | 65.7 | |
| XXXV | Butadiene-1,3 | 345 | 85 | |
| XXXVI | Crotonaldehyde | 320 | 64 | |
| XXXVII | Furfural | 330 | 5 | |
| XXXVIII | n-Hexane | 420 | 40 | |
| XXXIX | Isoheptane | 420 | 40 | |
| XXXX | Butanol | 430 | 30 | |
| XXXXI | Isoprene | 320 | 65 Citraconic Acid | |

[1] Catalyst of Example XII.
[2] Both maleic acid and phthalic anhydride produced.
[3] Yield in pounds per 100 pounds oxidizable material charged.

While this invention has been described with respect to certain embodiments, it is not so limited, and it is to be understood that variations and modifications thereof can be made without departing from the spirit or scope of the invention.

What is claimed is:

1. In a process of preparing an anhydride selected from the group consisting of maleic anhydride and phthalic anhydride by the controlled vapor phase oxidation of organic compounds oxidizable to said anhydride, the step comprising contacting a mixture of an organic chemical compound oxidizable to said anhydride and an oxygen containing gas at an elevated temperature with a catalyst comprising a mixture of oxides of vanadium, molybdenum and titanium in the proportions represented by the atomic percentages of said metals of from about 50 to about 90 atomic percent vanadium, from about 5 to about 45 atomic percent molybdenum and from about 2 to about 30 atomic percent titanium.

2. In a process of preparing an anhydride selected from the group consisting of maleic anhydride and phthalic anhydride by the controlled vapor phase catalytic oxidation of organic chemical compounds oxidizable to said anhydride, the step comprising passing a mixture of an organic chemical compound oxidizable to said anhydride and an oxygen containing gas at an elevated temperature through a catalyst mass comprising a carrier supporting a mixture of oxides of vanadium, molybdenum and titanium in the proportions represented by the atomic percentages of said metals of from about 50 to about 90 atomic percent vanadium, from about 5 to about 45 atomic percent molybdenum and from about 2 to about 30 atomic percent titanium.

3. In a process of preparing maleic anhydride by the controlled vapor phase catalytic oxidation of benzene, the step comprising passing a mixture of benzene and an oxygen containing gas at an elevated temperature through a catalyst mass comprising a carrier supporting a mixture of oxides of vanadium, molybdenum and titanium in the proportions represented by the atomic percentage of said metals of from about 50 to about 90 atomic percent vanadium, from about 5 to about 45 atomic percent molybdenum and from about 2 to about 30 atomic percent titanium.

4. In a process of preparing phthalic anhydride by the controlled vapor phase catalytic oxidation of naphthalene, the step comprising passing a mixture of naphthalene and an oxygen containing gas at an elevated temperature through a catalyst mass comprising a carrier supporting a mixture of oxides of vanadium, molybdenum and titanium in the proportions represented by the atomic percentages of said metals of from about 50 to about 90 atomic percent vanadium, from about 5 to about 45 atomic percent molybdenum and from about 2 to about 30 atomic percent titanium.

5. In a process for preparing maleic anhydride by the controlled vapor phase catalytic oxidation of benzene, the step comprising passing a mixture of benzene and an oxygen containing gas at a temperature of from 300° to 600° C. through a catalyst contact mass which comprises an inert carrier body composed of fused finely divided silica and finely divided particles of a refractory glass, supporting a mixture of oxides of vanadium, molybdenum and titanium in the proportions represented by the atomic percentages from said metals of from 50 to 90 atomic percent of vanadium, from 5 to 45 atomic percent of molybdenum and from 3 to 15 atomic percent of titanium.

6. A process of claim 5 wherein atomic percent vanadium is from 60 to 86, of molybdenum is 5 to 30 and of titanium is 8 to 10.

7. A process of claim 5 wherein atomic percent of vanadium is 81, of molybdenum is 10 and of titanium is 9.

8. A process of claim 5 wherein atomic percent of vanadium is 62, of molybdenum is 30 and of titanium is 8.

9. A process of claim 5 wherein the atomic percent of vanadium is 85.4, of molybdenum is 5.0 and of titanium is 9.6.

References Cited in the file of this patent

UNITED STATES PATENTS

| | | |
|---|---|---|
| 1,324,715 | Andrews | Dec. 9, 1919 |
| 1,880,901 | Drossbach | Oct. 4, 1932 |
| 2,215,095 | Drossbach | Sept. 17, 1940 |
| 2,625,554 | Darby | Jan. 13, 1953 |
| 2,674,582 | Darby | Apr. 6, 1954 |

FOREIGN PATENTS

| | | |
|---|---|---|
| 713,965 | Germany | Nov. 19, 1942 |
| 724,758 | Germany | Sept. 8, 1942 |
| 721,763 | France | Mar. 8, 1932 |
| 49,921 | France | Sept. 22, 1939 |
| 894,757 | France | Jan. 5, 1945 |